July 25, 1961 W. V. JOHNSON 2,993,659

TAPE WINDER

Filed April 10, 1958 4 Sheets-Sheet 1

INVENTOR.
W. V. JOHNSON

BY E.R. Hyde Jr.
ATTORNEY

July 25, 1961 W. V. JOHNSON 2,993,659

TAPE WINDER

Filed April 10, 1958 4 Sheets-Sheet 2

INVENTOR.
W. V. JOHNSON

BY E. R. Hyde Jr.
ATTORNEY

July 25, 1961 W. V. JOHNSON 2,993,659

TAPE WINDER

Filed April 10, 1958 4 Sheets-Sheet 3

INVENTOR.
W. V. JOHNSON

BY *E.R. Hyde Jr.*
ATTORNEY

July 25, 1961 W. V. JOHNSON 2,993,659

TAPE WINDER

Filed April 10, 1958 4 Sheets-Sheet 4

INVENTOR.
W. V. JOHNSON
BY E R Hyde Jr.
ATTORNEY 2,993,659
TAPE WINDER
William V. Johnson, West Orange, N.J., assignor to The Western Union Telegraph Company, New York, N.Y., a corporation of New York
Filed Apr. 10, 1958, Ser. No. 727,581
4 Claims. (Cl. 242—75.2)

The present invention relates to mechanism for winding tape material onto a reel or spool and more particularly to a tape winding device for perforated telegraph tape.

As telegraph message tape is fed from telegraph equipment such as a perforator or tape reader, it is customarily wound upon a reel. The tape winders that have been heretofore used have presented certain disadvantages that the present invention is designed to overcome. One such disadvantage is that the wound spool of tape is tighter toward the center and more loosely wound toward the outer edge. The reason for this is that as the reel fills with tape, the tension or pull on the tape being fed to the reel is decreased. With this decreased tension, as the reel fills, the winding of the tape becomes increasing looser and the wound tape spool is not uniform throughout. Thus less tape can be wound upon a spool, due to the looseness on the outside, than could ordinarily be wound were the tension on the tape uniform and an even wind thereby obtained. It is to this general problem that the present invention is directed.

Accordingly an object of the present invention is to provide a new and improved tape winder.

Another object of the present invention is to provide a tape winder wherein the spool of wound tape is of uniform and even distribution throughout.

Another object of the present invention is to provide a tape winder wherein the tension on the tape is constant regardless of the amount of tape wound upon the reel.

A further object of the present invention is to provide a tape winder wherein a tight, even wind of tape is obtained.

A further object of the present invention is to provide a tape winder which is of simple and economical construction and which is sure and certain in operation.

A still further object of the present invention is to provide a tape winder which is automatic in operation in that it is turned off when the tape supplied to it ceases.

A still further object of the present invention is to provide an automatic tape winder wherein the rate of tape fed to the winder controls the winder motor.

In accordance with these and other objects, the present invention utilizes a snubbing or tensioning device through which the telegraph tape passes as it feeds to the reel upon which it is wound. By a spring mechanism the tape is tensioned a fixed amount as it is fed to the winding reel. The amount of the snubbing action is the determining factor for the tension on the tape and thus the tape is tensioned a uniform amount regardless of the amount of tape on the reel.

The winding reel is operated by a motor which in turn is automatically controlled by a switch arm which is in contact with the tape fed to the winder. This switch arm operates as a detecting device so that when the supply of tape ceases or the rate of feed changes, the motor is turned on and off accordingly.

The invention will be more fully understood from the following description of a specific embodiment thereof taken with the drawings in which.

Figures 5, 6, 7:
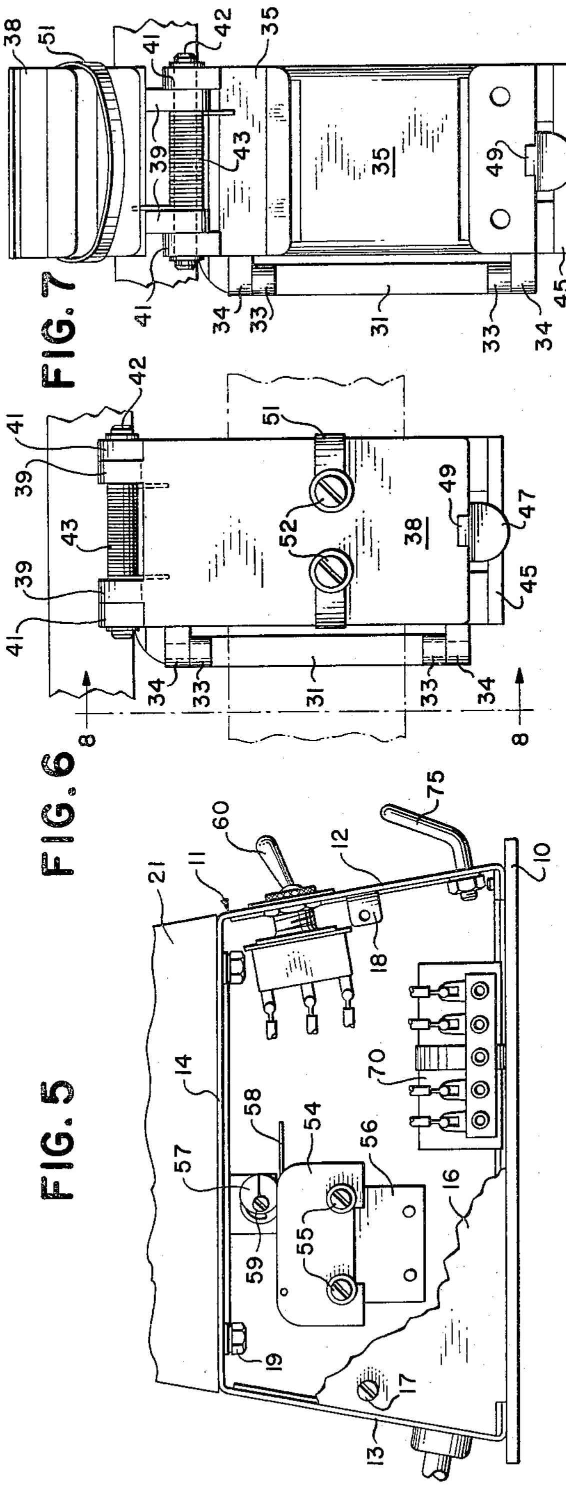
FIG. 5 is a side view of the lower portion of the tape winder with the casing cover partially broken away to show the interior of the winder.
FIG. 6 is a plan view of the snubber assembly with the snubber lid closed.
FIG. 7 is a view similar to FIG. 6 with the snubber lid open.

Referring now to the drawings, the tape winder is mounted upon a base plate 10 to which is secured a sheet metal casing 11. The sheet metal casing includes a front portion 12, a rear portion 13, an upper portion 14 and a side 15. A back cover 16 completes the enclosure and is secured in place by screws 17 received in threaded openings of a pair of lugs 18 which in turn are fastened to the front and rear of the casing. A motor is mounted upon the upper plate 14 by means of screws and nuts 19 as seen in FIG. 5. The motor is enclosed by a motor casing 21 which has air vents 22 for proper ventilation and cooling of the motor. A reel shaft 23 extends through one side of the motor casing and connects with the motor shaft within the casing. The reel shaft has a pair of ball detents 24 which are spring urged outwardly in a known manner to secure the reel 25 to the shaft. It is readily seen then that operation of the motor withing casing 21 results in rotation of reel 25.

Figures 8, 9, 10:
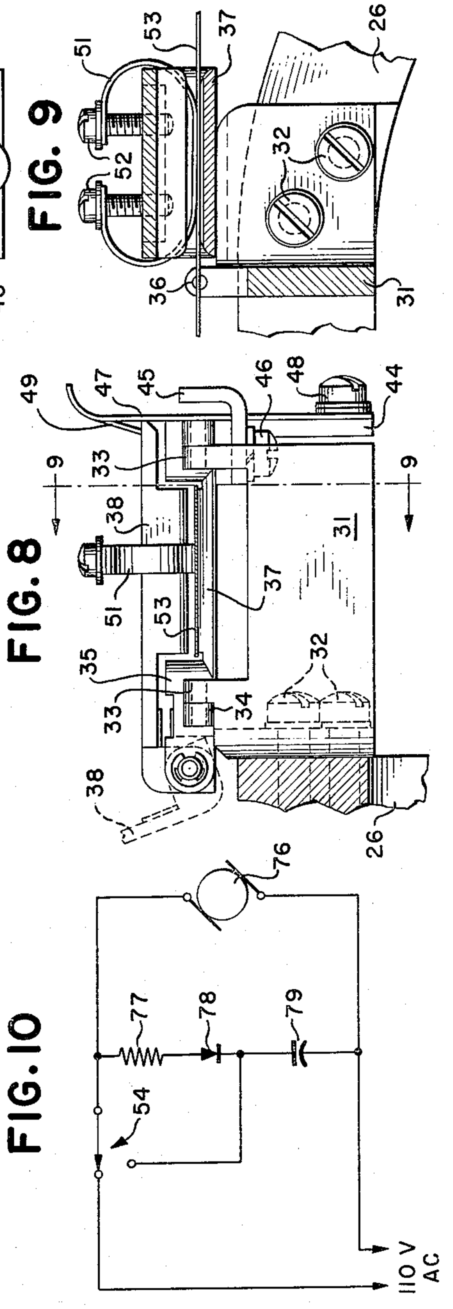
FIG. 8 is a front view of the snubber assembly taken on the line 8—8 of FIG. 6.
FIG. 9 is a section of the snubber assembly taken on the line 9—9 of FIG. 8.
FIG. 10 is a schematic diagram of the motor control circuit.

A snubber support arm 26 is secured by means of screws 27 to a support arm bracket 28 which is generally L-shaped and mounted to the top 14 of the casing. The snubber support arm extends outwardly and upwardly as seen more clearly in FIG. 2 and serves to support a snubber assembly generally indicated by numeral 29. The snubber assembly includes a hinge 31 which is L-shaped and secured to the snubber support arm by means of screws 32. A pair of ears 33 extend upwardly from hinge 31 and are aligned with another pair of ears 34 of a snubber guide 35. Ears 33 and 34 have aligned holes passing therethrough to receive hinge pins 36 so that the snubber guide 35 is pivotally mounted. The snubber guide 35 extends across the path of the tape and has a cut-out portion 37 over which the tape is fed. A snubber lid 38 is provided and has a pair of ears 39 which are aligned with another pair of ears 41 extending upwardly from one edge of the snubber guide. These ears have aligned holes which receive a pin 42 so that the snubber lid is hinged and may be opened or pivoted laterally of the direction of tape feed. A coiled tension spring 43 surrounds the pin 42 between ears 39 and has two extending ends which are located between the undersurface of snubber lid 38 and the upper surface of snubber guide 35. The coiled spring therefore serves to urge the snubber lid to its open position. Snubber lid 38 has a downwardly extending center portion as seen more clearly in FIG. 8, which coincides with the cut-out section of the snubber guide. With the lid in its closed position a small space exists between the snubber guide and snubber lid. A snubber latch bracket 44 and a latch stop 45, each of which is generally L-shaped, are secured to the undersurface of the snubber guide at one edge thereof, as seen in FIG. 8, by screws 46. A snubber latch in the form of a leaf spring 47 is secured at one end to the lower end of bracket 44 by screws 48. The latch spring 47 has a stamped out portion 49 that engages the upper surface of snubber lid 38 at one end thereof to maintain the snubber lid in its closed position against the action of spring 43. A snubber spring 51 encircles the bottom surface and outer edges of snubber lid 38. This spring is secured in place by means of screws 52 passing through the ends of the spring and into tapped holes in the snubber lid. The snubber spring is free to extend downwardly and into contact with the upper surface of the snubber guide 37 as seen in FIGS. 8 and 9. It is readily understood that as the telegraph tape 53 passes through the snubber assembly between the snubber guide and snubber lid, the spring 51 is pressing into contact with the upper surface of the tape which causes a predetermined amount of tension on the tape depending upon the physical characteristics of spring 51 and the positioning of its adjusting screws 52.

Figure 1:
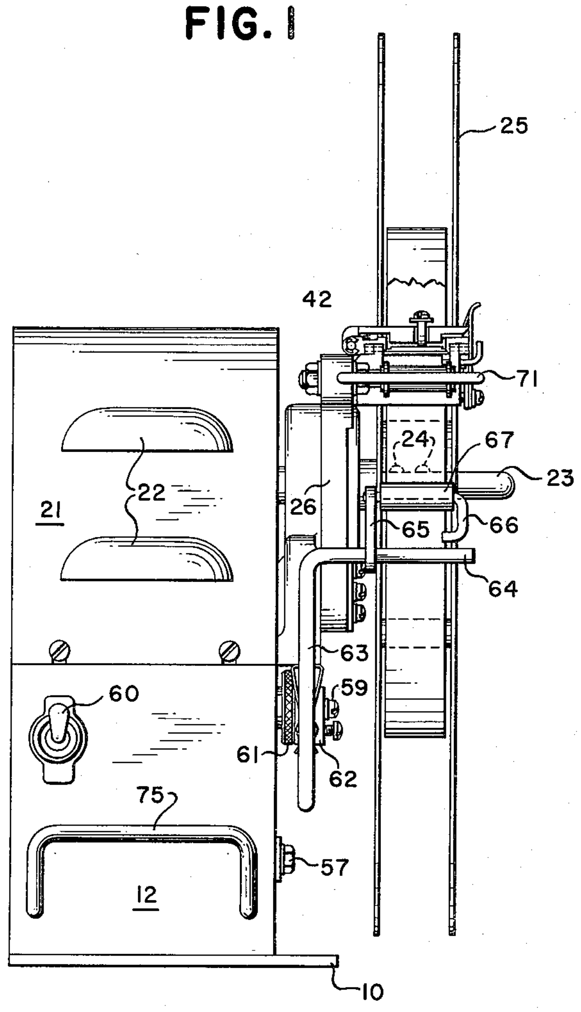
FIG. 1 is a front view of the tape winder of the present invention.
Figures 2, 4:
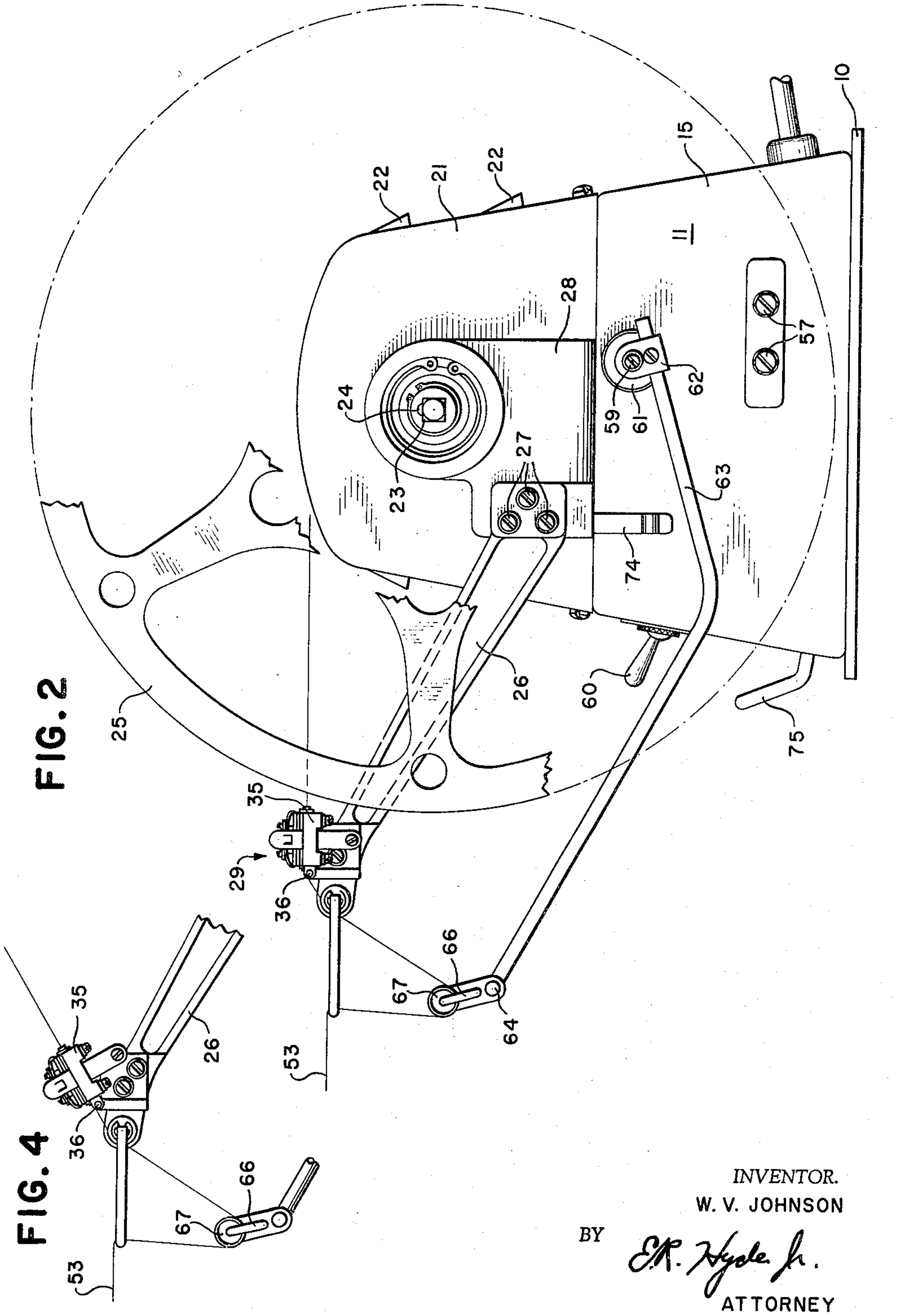
FIG. 2 is a side view with the tape reel partially broken away to show certain features of the winder.
FIG. 4 is a side view of the snubber assembly showing the telegraph tape passing therethrough.
Figure 3:
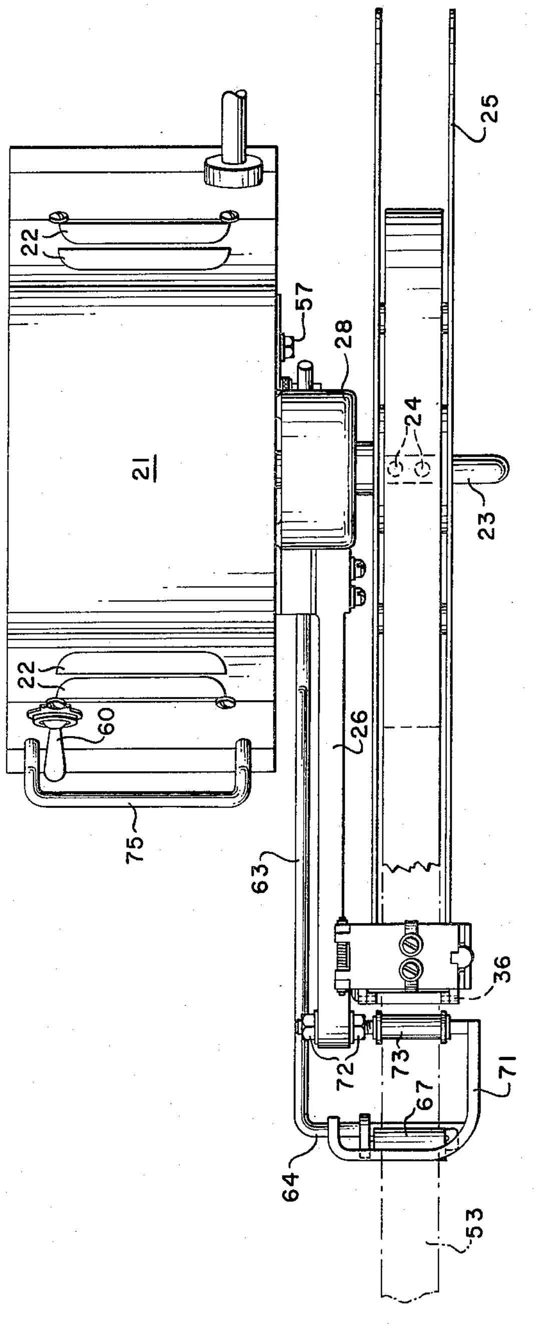
FIG. 3 is a top view of the winder of FIG. 1.

The motor within the casing 21 is turned on and off by a microswitch 54 which is secured by screws 55 to a switch bracket 56. Bracket 56 is mounted within the casing 11 by means of screws passing therethrough. In order to actuate the microswitch, a cam 57 is provided which is in contact with the switch arm 58. This cam is mounted on a cam shaft 59 passing through the casing 11. The cam shaft has an adjusting disc 61 secured thereto and located outside the casing 11 as seen in FIG. 2. With disc 61 thus secured to the cam shaft, a manual adjustment of the cam 57 is provided for a purpose which will become apparent hereinafter. A switch arm clamp 62 is secured to the end of cam shaft 59 and also serves to mount switch arm 63. The switch arm may be offset and extend forwardly and upwardly to terminate in a bent portion 64, as seen in FIG. 1, which extends across the path of the telegraph tape 53. An upwardly extending arm 65 is secured to the bent end section 64 and serves to secure a guide rod 66 which in turn rotatably mounts a roller 67. It is seen then by raising and lowering the switch arm 63 the cam 57 is rotated which in turn actuates the motor switch 54.

In threading the tape from the adjacent telegraph equipment to the reel, it is passed over either one of two free sides of a generally rectangular stationary guide rod 71, the third side of which is secured at one end to the snubber support arm 26 by nuts 72. This third side of the guide rod also serves to support a guide roller 73. The fourth side of the guide rod is open to pass the tape laterally into the guide rod in threading the tape on the apparatus. After the tape passes over either the free forward side or outer lateral side of the guide rod 71, it is threaded under roller 67 mounted at the end of switch arm 63 which is free to rotate. It is noted that the bent down arm of the L-shaped rod 66 is spaced a small distance from the bent over end 64 of the switch arm as seen more clearly in FIG. 1. This space permits the tape to be conveniently inserted under roller 67. The tape then passes upwardly over the guide roller 73 and then through the snubber assembly 29. In inserting the tape in the snubber assembly, the latch spring 47 is manually deflected so that the snubber lid 38 will pivot laterally of the tape under the action of coil spring 43. The tape is then laid upon the upper surface of the snubber guide and the snubber lid is then closed and maintained in this position by latch spring 47. With the snubber lid thus closed, the snubber spring 51 engages the upper surface of the tape so that the tape passes through the snubber assembly with a predetermined amount of friction determined by the action of spring 51. The tape is then secured in a conventional manner to the center of reel 25. The rectangular form of the stationary guide rod 71 permits the tape to be fed from an adjacent telegraph equipment in planes perpendicular or parallel to the rear side of rod 71 on which roller 73 rotates, without interfering with formation of the tape loop whose bight or axis passes under roller 67.

It is seen then that a loop of tape exists that controls the position of switch arm 63. The cam 57 which connects with the switch arm is thus rotated so that as the switch arm is lowered due to the feed of tape, switch 54 is turned on to energize the motor. The cam 57 is set by the cam adjusting disc 61 so that when the switch arm is approximately six inches below its raised position, the switch 54 is closed to energize the winder motor. If the motor winds tape faster than it is being fed to the winder, the tape loop will decrease in size and the switch arm 63 will be raised until it is approximately two inches below its normal raised position at which point cam 57 will open switch 54 to deenergize the winder motor. It is seen then that the tape loop controlling the switch arm operates to automatically energize and deenergize the motor to wind the tape in accordance with the rate of tape feed. The tape loop also insures a minimum of tape pull upon the adjacent telegraph equipment which may be a perforator or a tape reader.

As the tape is wound upon the reel and the wind of tape becomes larger, it is seen that the angle of the length of tape between the snubber assembly 29 and the point at which the tape is wound upon the reel changes. This change of angle would change or alter the tension of the tape were it not for the pivoted mounting of the snubber guide 37. Reference is made to FIG. 4, where the angle of the length of tape is steep and compensated for by the snubber assembly which pivots longitudinally of the direction of tape feed.

When the tape winder is not in use the switch arm 63 may be locked in its raised position by means of catch 74 which is secured to the under edge of bracket 28. Also a handle 75 is provided so that the winder may be conveniently moved from one location to another. A main toggle switch 60 is mounted to the front face of casing 11 and serves as a means to turn the winder on and off. In addition a terminal block 70 is conveniently located within the housing.

Referring now to FIG. 10, it is seen that the winder motor 76 is connected to a standard 110 volt 60 cycle supply through the cam actuated switch 54. With this switch in the position shown in FIG. 10, the motor will be energized and tape will wind upon the reel. A resistor 77, diode 78 and capacitor 79 are serially connected across the field winding of the motor so that when the motor is energized the capacitor 79 will charge. As the tape loop above described decreases in size due to a slower rate of tape feed, the switch 54 assumes its open position to deenergize motor 76 and apply charged capacitor 79 across the motor field winding to dynamically brake the motor.

Although the present invention has been described with respect to the specific embodiment thereof, it is understood that this is not to be considered as limiting the scope of the invention as set forth in the appended claims.

What is claimed is:

1. A tape winder of the character described comprising a reel adapted to receive telegraph tape, a stationary support arm, tape tensioning means pivotally mounted on said arm adjacent the outer periphery of said reel adapted to provide a constant restraining force upon tape passing to said reel as the wind of tape on the reel increases, motor means connected to selectively rotate the reel, switch means connected to control energization of said motor means, a pivotally mounted switch arm operatively connected to said switch means, a first tape roller secured at one end of said switch arm, a generally rectangular stationary tape guide rod supported on said support arm, another roller carried by said tape guide rod, said tape guide rod and other roller forming a loop of tape having its bight passing under said first tape roller in advance of the tape tensioning means whereby the rate of feed of tape determines the position of said pivotally mounted switch arm, and cam means connected to said switch arm whereby a decrease in tape feed to the tape winder causes a raising of the switch arm and deenergization of the motor means.

2. A tape winder of the character described comprising a reel adapted to receive telegraph tape, a stationary support arm, tape tensioning means pivotally mounted on said arm adjacent the outer periphery of said reel adapted to provide a constant restraining force upon tape passing to said reel as the wind of tape on the reel increases, motor means connected to selectively rotate the reel, switch means connected to control energization of said motor means, a pivotally mounted switch arm operatively connected to said switch means, a tape roller secured at one end of said switch arm, a stationary rectangular tape guide rod supported near said tape tensioning means on said support arm to form a loop of tape passing over said guide rod, and under said tape roller in advance of the tape tensioning means whereby the lengths of reversely directed portions of the tape loop determine the position of said pivotally mounted switch arm, cam means connected to said switch arm whereby a decrease in tape feed to the tape winder causes a raising of the switch arm to operate said motor switch means and deenergize said motor and means to dynamically brake said motor upon deenergization thereof.

3. A device for winding telegraph tape, comprising a reel upon which tape is wound, a stationary support, motor means to rotate said reel, tape tensioning means mounted on said support, said tape tensioning means including a tape guide member adapted to receive tape passing to said reel, said tape guide member being pivotally mounted on said support to pivot longitudinally of the direction of tape feed to the reel to maintain constant tension on the tape as the tape is wound on the reel, a lid member positioned above the guide member, said lid member being pivotally mounted laterally of the direction of tape feed to facilitate insertion of the tape on the guide member, spring means secured to said lid member, said spring means extending longitudinally of the direction of tape feed and adapted to press downward against the upper surface of the guide member when said lid member is in its closed position, latch means to lock the lid member in its closed position, switch means connected to control energization of said motor means, a pivotally mounted switch arm operatively connected to said switch means, a first tape roller secured at one end of said switch arm, a generally rectangular stationary tape guide rod secured to said support, a second tape roller carried by one side of said tape guide rod, said guide rod having two perpendicularly disposed free sides for feeding tape through the tape guide rod in directions perpendicular and parallel to said one side of the tape guide rod, said tape forming a loop having its apex passing under the first tape roller in advance of the tape tensioning means, whereby the rate of feed of tape determines the position of said switch arm, and cam means connected to said switch arm, whereby a decrease in tape feed and increase in tape tension to the tape reel causes a raising of the switch arm and deenergizing of the motor means to stop rotation of the reel.

4. A device for winding telegraph tape, comprising a reel upon which tape is wound, a stationary support, motor means to rotate said reel, tape tensioning means mounted on said support, said tape tensioning means including a tape guide member adapted to receive tape passing to said reel, said tape guide member being pivotally mounted on said support to pivot longitudinally of the direction of tape feed to the reel to maintain constant tension on the tape as the tape is wound on the reel, switch means connected to control energization of said motor means, a pivotally mounted switch arm operatively connected to said switch means, a first tape roller secured at one end of said switch arm, a generally rectangular stationary tape guide rod secured to said support, a second tape roller carried by one side of said tape guide rod, said guide rod having two perpendicularly disposed free sides for feeding tape through the tape guide rod in directions perpendicular and parallel to said one side of the tape guide rod, said tape forming a loop having its apex passing under the first tape roller in advance of the tape tensioning means, whereby the rate of feed of tape determines the position of said switch arm, and cam means connected to said switch arm, whereby a decrease in tape feed and increase in tape tension to the tape reel causes a raising of the switch arm and deenergizing of the motor means to stop rotation of the reel.

References Cited in the file of this patent

UNITED STATES PATENTS

| | | |
|---|---|---|
| 1,038,369 | Howe | Sept. 10, 1912 |
| 1,418,653 | Kilgore | June 6, 1922 |
| 1,857,817 | McCann | May 10, 1932 |
| 2,164,919 | Harmon | July 4, 1939 |
| 2,700,513 | Miles | Jan. 25, 1955 |
| 2,834,556 | Kraft | May 13, 1958 |